May 8, 1934.  R. W. CROSS  1,958,184
MECHANISM FOR MOLDING PLASTIC MATERIAL
Filed Dec. 5, 1929    2 Sheets-Sheet 1
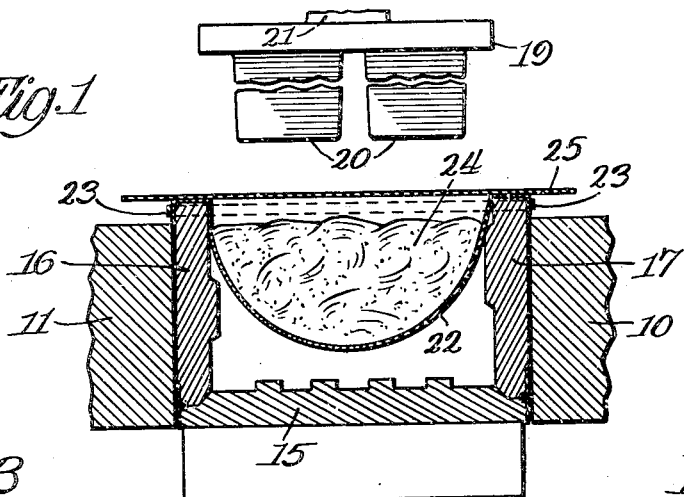
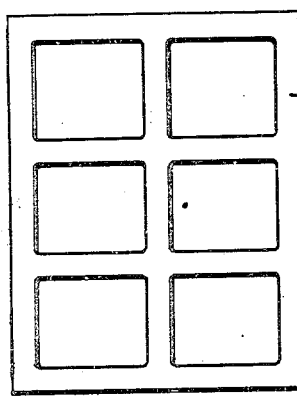
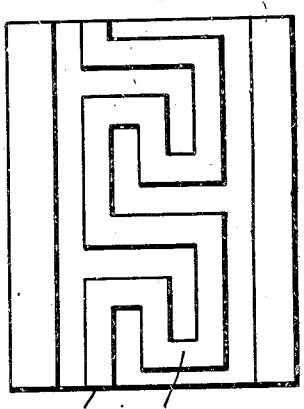
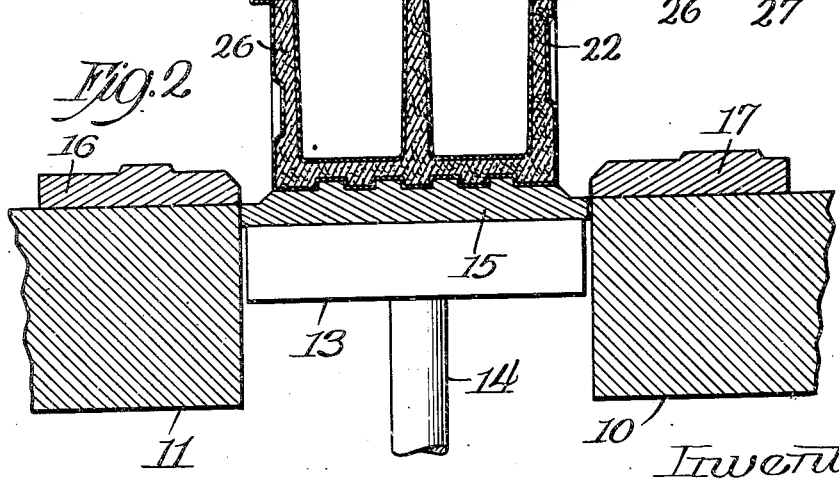
Inventor
Richard W. Cross

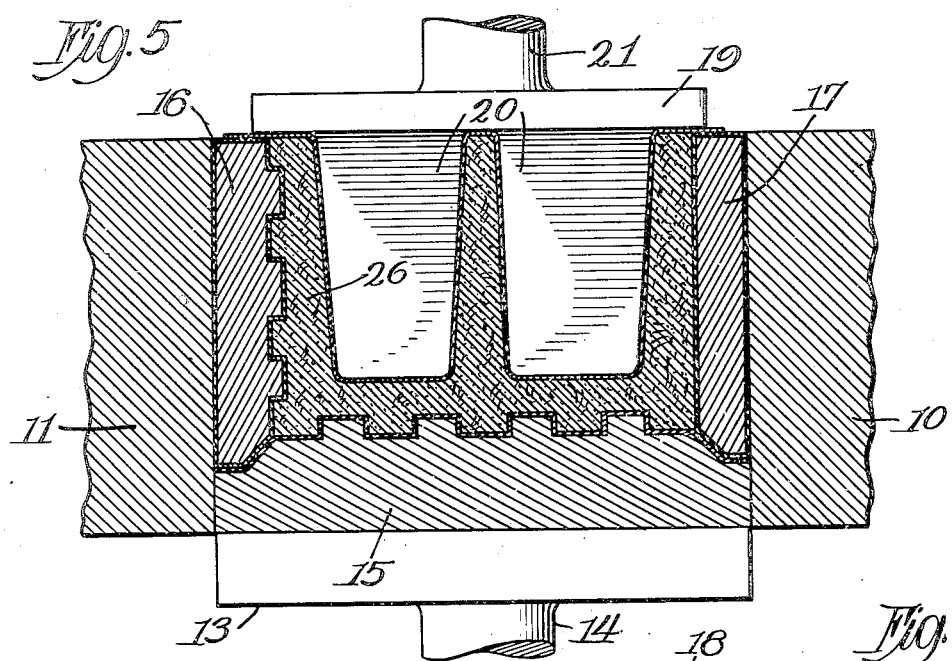
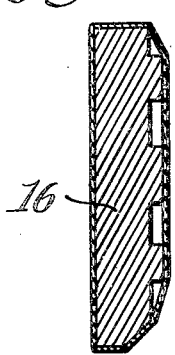
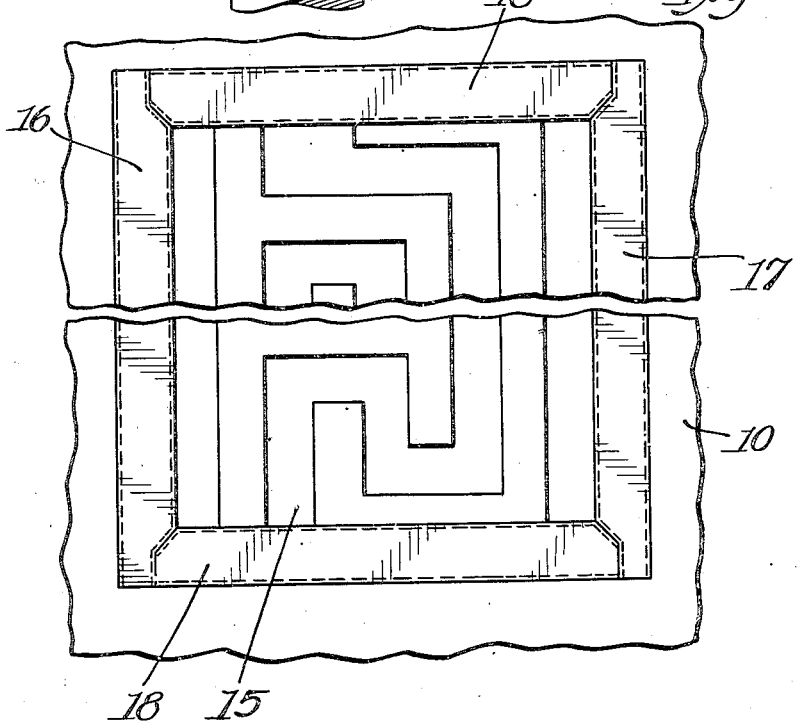

Patented May 8, 1934

1,958,184

UNITED STATES PATENT OFFICE 1,958,184

MECHANISM FOR MOLDING PLASTIC MATERIAL

Richard W. Cross, Chicago, Ill.

Application December 5, 1929, Serial No. 411,717

4 Claims. (Cl. 25—122)

The invention relates to a process and to mechanism for molding plastic material of any kind for the formation of objects such as terra cotta, tile, art stone, sanitary ware, and clay objects generally, and one of its objects is the provision of improved means for insuring a perfect product in that the material is forced fully into all of the cavities or recesses in the mold and may be removed from the mold without danger of tearing. A further object is to prevent injury to the molds by absorption, abrasion or rusting.

The invention consists in part of a power actuated mold in which the elements thereof may be forced together with great pressure and have associated with them a lining sheet having one or more of the characteristics of being flexible, elastic and impervious to moisture.

The process consists in interposing between the elements of the mold and the material to be operated upon, a sheet having one or more of the above characteristics, and applying pressure to a movable element of the mold sufficient to compel the material and the lining element to completely follow the configuration of the mold pattern.

In the accompanying drawings,

Fig. 1 is a vertical section, some of the parts being broken away, of the mold at the inception of the compressing operation;

Fig. 2 is a similar view, showing the mechanism in position for discharging the molded article;

Fig. 3 is a top plan view of an article produced by the improved method;

Fig. 4 is an inverted plan view of the same;

Fig. 5 is a vertical section of a modified form of this invention in which an elastic liner envelops each of the side walls;

Fig. 6 is a plan view of the modified form; and

Fig. 7 is a sectional view of one of the side walls equipped with the elastic liner.

As molded articles formed of plastic material have heretofore been produced, great difficulty has been experienced in securing a perfect product because of failure of the material to completely follow the configuration of the pattern, and because of a tendency of the material to adhere to the mold with such tenacity as to cause the tearing or fracture of the surface of the article, and consequently requiring hand finishing. These defects have rendered it extremely difficult to use power in the molding operation, and for that reason the molding has been accomplished mainly by hand.

Where plaster molds are used the percentage of moisture in the material may be reduced as it is unnecessary to satisfy the absorptive action of the mold. Where heavy pressure is used in the molding operation a larger percentage of moisture may be present in the material than is now practicable to increase its plasticity, the pressure insuring sufficient compactness to permit immediate removal of the object from the mold without waiting for it to dry out.

The improved process increases the durability of the molds, whether of metal, plaster, wood or composition, because they are protected from moisture and from the abrasive action of the material.

For the purpose of illustration, there is shown a molding apparatus, generally of known construction, comprising a plunger 13 having a stem 14 through which pressure may be applied, the plunger reciprocating vertically through an aperture in a suitably supported bed plate, portions of which are represented at 10 and 11.

The drag element of the mold rests upon the plunger 13 and is here shown as sectional in form, comprising a bottom 15 and side and end walls 16, 17 and 18, 18, these walls being movable with reference to the bottom, being here shown as hinged thereto in order that they may be folded down as indicated in Fig. 2 for convenience in removing the finished article, and may be erected to the position shown in Fig. 1 to give the drag a boxlike form, suitable fastening devices being applied for holding them in the closed position.

The device comprises further a cope element 19 carrying portions of the pattern as 20 and being itself carried by a suitable rod 21 to which power may be applied for forcing the cope into cooperation with the drag, and removing it from engagement therewith when the molding operation is completed.

The improvement in this and other forms of molds of whatever material made, and in the process of molding plastic material, consists in the addition of a sheet 22 of rubber or other suitable material which is secured across the top of the closed drag and clamped thereto as indicated at 23, and after the plastic material 24, sufficient in quantity to form the completed article, has been deposited upon this sheet as indicated in Fig. 1, a second sheet, 25, of like material, is placed over it. The cope and drag being now forced together by the movement of one or both of them, the material is forced into intimate relation with the patterns of both of the mold elements, the sheets 22 and 25 constituting a lining for the patterns and preventing the material from coming in contact therewith.

For the purpose of illustration, a pattern has been chosen for producing a chambered object 26, shown in plan in Fig. 3, and having on one of its external faces a pattern 27 as shown in Fig. 4.

Upon the completion of the molding operation the cope is withdrawn from the drag and the drag is opened as indicated in Fig. 2, whereupon the article molded may be readily removed. The lining sheets 22 and 25 have no tendency to adhere to the pattern and may be readily removed from the molded article without tearing its surface.

Sufficient pressure may be used in the molding operation to insure the production of a perfect copy of the pattern, obviating the necessiay for hand finishing. These sheets also prevent the abrasive action of the material upon the molds and also protect them from the moisture within the material. The life of the mold is thereby indefinitely prolonged.

While so far as at present advised, sheet rubber is believed to be the most desirable liner, any material may be used which will afford the desirable protection of the mold and the product, and which will be forced into intimate relation with all parts of the pattern by the pressure applied. The invention is of sufficient scope to include not only the mechanism shown and described, but any mechanism which will provide for the application of pressure to the mold elements.

The invention has the further advantage of permitting the use of adequate pressure to so compress the material as to greatly increase its tensile strength and in consequence articles may be made of much less weight than has heretofore been found practicable.

In the modified form of the invention shown in Figs. 5, 6 and 7, the elastic material interposed between the plastic material and the face of the mold is carried by the individual portions of the mold. The liner for the bottom wall 15 is merely stretched across the face of the member and is held taut by the side walls 16 and 17. The liners for the side walls take the form of an elastic band and completely encircle the walls. There should be sufficient tension in the liners when the mold is empty so that the portion of the liner adjacent the mold face will be held taut.

When the mold is removed from the bed plate 10 and 11, the side walls 16 and 17 may be pulled away without damage to the molded piece by virtue of the elasticity of the liner.

I claim as my invention:

1. A collapsible mold for fabricating tiles, terra cotta work, clay objects and the like, comprising a bottom wall, side walls removably placed about the bottom wall and adapted to be held against lateral outwardly directed pressure, one of said side walls being provided with a pattern-molding face, and flexible elastic liners placed over the interior faces of the side walls and secured thereto adjacent the margins of the side walls so that when molding pressure is applied the molding material will be forced into all of the interstices of the mold and upon removing the side walls after the molding operation, the liners will effect a clean separation of the molded piece from the side walls.

2. A collapsible mold for fabricating tiles, terra cotta work, clay objects and the like, comprising a bottom wall, side walls removably placed about the bottom wall and adapted to be held against lateral outwardly directed pressure, one of said side walls being provided with a pattern-molding face, and flexible elastic bands fitted tightly over the side walls and secured thereto adjacent the margins of said walls and serving as liners to protect the walls of the mold from moisture and the abrasive action of the material in the mold, said liners being adapted to permit the molding material to enter all the interstices of the mold upon the application of molding pressure, and to effect a clean break with the molded piece when the side walls are removed.

3. In a mold for fabricating tiles, terra cotta work, clay objects and the like, a substantially flat, side wall having an interior face bearing a pattern to be applied to the material being molded, and a flexible elastic liner stretched over the face and secured to the wall so that when pressure is applied the material in the mold will be forced into the pattern and upon separating the molded piece from the wall, the elasticity of the stretched liner will effect a clean break from the side walls.

4. In a mold for fabricating tiles, terra cotta work, clay objects and the like, a wall having a molding face provided with a pattern to be applied to the material being molded, and a flexible elastic liner stretched over the face and adapted to permit the molding material to force the liner to enter all of the interstices of the pattern upon the application of molding pressure, the liner being fixed to the face at points adjacent the margins of the face and adapted to be stretched only between said points upon the application of molding pressure, said liner tending to effect a clean separation of the molded piece from the pattern-bearing face upon the release of the molding pressure.

RICHARD W. CROSS.